US010652836B2

(12) United States Patent
Fang et al.

(10) Patent No.: US 10,652,836 B2
(45) Date of Patent: May 12, 2020

(54) SWITCHING THRESHOLD SETTING METHOD AND APPARATUS AND DEVICE

(71) Applicant: Huawei Technologies Co., Ltd., Shenzhen (CN)

(72) Inventors: Ping Fang, Shenzhen (CN); Qiang Xiao, Düsseldorf (DE); Zhenguo Du, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/065,955

(22) PCT Filed: Dec. 25, 2015

(86) PCT No.: PCT/CN2015/099067
§ 371 (c)(1),
(2) Date: Jun. 25, 2018

(87) PCT Pub. No.: WO2017/107214
PCT Pub. Date: Jun. 29, 2017

(65) Prior Publication Data
US 2019/0014545 A1 Jan. 10, 2019

(51) Int. Cl.
*H04W 52/24* (2009.01)
*H04W 36/00* (2009.01)
*H04W 76/30* (2018.01)
*H04W 72/00* (2009.01)
*H04W 72/04* (2009.01)
(Continued)

(52) U.S. Cl.
CPC ... *H04W 52/245* (2013.01); *H04W 36/00837* (2018.08); *H04W 72/005* (2013.01); *H04W 72/048* (2013.01); *H04W 76/30* (2018.02); *H04W 36/08* (2013.01); *H04W 84/12* (2013.01)

(58) Field of Classification Search
CPC ..... H04W 84/12; H04W 36/08; H04W 36/30; H04W 36/00837; H04W 48/20; H04W 36/0083; H04W 36/14; H04W 36/22; H04W 36/36; H04W 48/16; H04W 12/003; H04W 12/00503; H04W 16/30; H04W 24/08; H04W 24/10; H04W 36/0061; H04W 36/04
See application file for complete search history.

(56) References Cited

U.S. PATENT DOCUMENTS 9,143,883 B2 9/2015 Han et al.
2008/0316969 A1* 12/2008 Prakash ................ H04W 36/30
370/331

(Continued)

FOREIGN PATENT DOCUMENTS

CN 101754300 A 6/2010
CN 102427595 A 4/2012
(Continued)

*Primary Examiner* — Golam Sorowar
(74) *Attorney, Agent, or Firm* — Slater Matsil, LLP

(57) ABSTRACT

Embodiments provide a switching threshold setting method and apparatus, and a device, applied to a wireless local area network. A switching threshold of a terminal and a switching threshold of a wireless access device that match each other are set, so that when the wireless access device is to release an association with the terminal, the terminal has started roaming to find a target wireless access device.

14 Claims, 7 Drawing Sheets

(51) Int. Cl.
  *H04W 36/08*  (2009.01)
  *H04W 84/12*  (2009.01)

(56) References Cited

U.S. PATENT DOCUMENTS

| | | |
|---|---|---|
| 2009/0156220 A1 | 6/2009 | Bae et al. |
| 2012/0135777 A1* | 5/2012 | Karpoor ............. H04W 52/146 |
| | | 455/522 |
| 2012/0327898 A1 | 12/2012 | Lu |
| 2013/0188499 A1* | 7/2013 | Mach ................... H04W 48/20 |
| | | 370/252 |
| 2013/0272269 A1* | 10/2013 | Srivastava ............ H04W 36/30 |
| | | 370/332 |
| 2014/0119279 A1 | 5/2014 | Han et al. |
| 2015/0098392 A1 | 4/2015 | Homchaudhuri et al. |
| 2015/0148031 A1 | 5/2015 | He et al. |
| 2015/0312825 A1* | 10/2015 | Hoglund ............... H04W 36/18 |
| | | 370/331 |

FOREIGN PATENT DOCUMENTS

| | | |
|---|---|---|
| CN | 102917424 A | 2/2013 |
| CN | 103501507 A | 1/2014 |
| CN | 103596227 A | 2/2014 |
| CN | 104320817 A | 1/2015 |

\* cited by examiner

SWITCHING THRESHOLD SETTING METHOD AND APPARATUS AND DEVICE

CROSS-REFERENCE TO RELATED APPLICATIONS

This application is a national stage of International Application No. PCT/CN2015/099067, filed on Dec. 25, 2015, which application is hereby incorporated by reference in their entireties.

TECHNICAL FIELD

Embodiments of the present invention relate to wireless communications technologies, and in particular, to a switching threshold setting method and apparatus, and a device.

BACKGROUND

As a short-range wireless communications technology, a Wireless Fidelity (Wi-Fi) technology is widely used due to characteristics such as a free spectrum and a high transmission rate. For example, Wi-Fi wireless access devices are disposed on occasions such as a household, an enterprise office, and a large conference room. A user can access a network anytime anywhere by using a terminal such as a mobile phone or a tablet computer that has a Wi-Fi network interface.

In a scenario such as an enterprise office or a large conference room, multiple wireless access devices are usually deployed to implement contiguous coverage, and a terminal is allowed to perform roaming switching between different wireless access devices. In a specific application, when a user who carries a terminal having a Wi-Fi network interface moves, the terminal detects signal strength of a currently connected wireless access device. When the terminal detects that the signal strength of the currently connected wireless access device becomes weak and is less than a switching threshold of the terminal, the terminal starts a roaming process and scans signal strength of a surrounding wireless access device. The switching threshold of the terminal is a critical value of the signal strength of the wireless access device from which the terminal starts roaming. When detecting another wireless access device having relatively strong signal strength, that is, a target wireless access device, the terminal directly establishes an association with the target wireless access device or establishes an association with the target wireless access device using the currently connected wireless access device. In addition, to improve network performance, when detecting that signal strength of the terminal is less than a switching threshold of a wireless access device in an enterprise network, the wireless access device starts a process of putting the terminal offline to release an association with the terminal. The switching threshold of the wireless access device is a critical value of the signal strength of the terminal with which the wireless access device actively releases the association.

Generally, both the switching threshold of the terminal and the switching threshold of the wireless access device are preset. Specifically, because a transmit power of the wireless access device is greater than a transmit power of the terminal, in a same transmission condition, the signal strength of the wireless access device detected by the terminal is relatively strong while the signal strength of the terminal detected by the wireless access device is relatively weak. Therefore, a scenario may occur in which the signal strength of the terminal detected by the wireless access device has reached the switching threshold of the wireless access device while the signal strength that is of the wireless access device and that is detected by the terminal is still greater than the switching threshold of the terminal. That is, the terminal has not started roaming but the wireless access device has put the terminal offline, and consequently the terminal is disconnected from the network.

To prevent the terminal from being put offline by the wireless access device before the terminal starts roaming, in an actual application, the switching threshold of the terminal is greater than the switching threshold of the wireless access device, so that the terminal has started roaming before being put offline by the wireless access device. However, if the switching threshold of the wireless access device is set to be excessively low, a new problem occurs. The terminal detects that the signal strength of the wireless access device is greater than the switching threshold of the terminal, while the wireless access device detects that the signal strength of the terminal is relatively weak but is still greater than the switching threshold of the wireless access device. In this case, the terminal cannot start roaming, and the wireless access device cannot actively release the association with the terminal, either. Consequently, the terminal is still associated with the wireless access device whose signal strength is relatively weak, and user experience of network access is affected.

Based on the foregoing reason, an urgent problem currently to be resolved is how to set a switching threshold of a terminal and a switching threshold of a wireless access device that match each other, so that the terminal has started roaming to find a target wireless access device when the wireless access device is to release a wireless communication connection to the terminal.

SUMMARY

The present invention provides a switching threshold setting method and apparatus, and a device. A switching threshold of a terminal and a switching threshold of a wireless access device that match each other are set, so that when the wireless access device is to release an association with the terminal, the terminal has started roaming to find a target wireless access device, and communication quality of the terminal in a wireless local area network is ensured.

According to a first aspect, the present invention provides a switching threshold setting method. The method includes obtaining, by a first device, a switching threshold of a second device and a transmit power of the second device. The method also includes determining and setting, by the first device, a switching threshold of the first device according to the switching threshold of the second device, the transmit power of the second device, and a transmit power of the first device, where when the first device detects that signal strength of the second device is less than the switching threshold of the first device, the first device is to release a wireless communication connection to the second device.

In this implementation, the switching threshold of the first device is determined by negotiation by the first device and the second device, so that the switching threshold of the first device matches the switching threshold of the second device. For a wireless access device, when the wireless access device detects that signal strength of a terminal reaches a switching threshold of the wireless access device, the wireless access device starts releasing of a wireless communication connection to the terminal. For the terminal having a roaming function, when the wireless access device detects that the signal strength of the terminal reaches the switching threshold of the wireless access device, and starts releasing of the wireless communication connection to the terminal, the terminal has detected that signal strength of the wireless access device reaches a switching threshold of the terminal, and starts a roaming process to find a target wireless access device. In this way, wireless communication continuity of the terminal in a wireless local area network is ensured, and communication quality of another terminal that establishes a wireless communication connection to the wireless access device is improved.

In a first implementation of the first aspect, the determining and setting, by the first device, a switching threshold of the first device according to the switching threshold of the second device, the transmit power of the second device, and a transmit power of the first device includes: obtaining, by the first device, a first sum value by calculating a sum of a difference between the transmit power of the second device and the transmit power of the first device and the switching threshold of the second device; and determining and setting, by the first device, the switching threshold of the first device according to the first sum value. In this implementation, a specific method for setting the switching threshold of the first device is provided, but the present invention is not limited thereto.

In a second implementation of the first aspect, when the first device is a terminal and the second device is a wireless access device, the determining and setting, by the first device, the switching threshold of the first device according to the first sum value includes: determining and setting, by the first device, the switching threshold of the first device to be greater than the first sum value.

On the basis of the foregoing implementation, in this implementation, the switching threshold of the first device is set to be greater than the first sum value, so that it is ensured that the terminal has roamed to a target wireless access device before the wireless access device puts the terminal offline, a problem that the terminal has not started a roaming process when the terminal is put offline by the wireless access device is avoided, and wireless communication continuity of the terminal in the wireless local area network is further ensured.

In a third implementation of the first aspect, the obtaining, by a first device, a switching threshold of a second device and a transmit power of the second device includes: reading, by the first device, the pre-stored switching threshold of the second device and the pre-stored transmit power of the second device; or receiving, by the first device, the switching threshold of the second device and the transmit power of the second device that are sent by the second device.

In a fourth implementation of the first aspect, before the obtaining, by a first device, a switching threshold of a second device and a transmit power of the second device, the method further includes: sending, by the first device, a first message to the second device, where the first message requests the second device to send the switching threshold of the second device and the transmit power of the second device to the first device.

In this implementation, the first device sends, to the second device, the first message that requests the second device to send the switching threshold of the second device and the transmit power of the second device, so that the switching threshold of the second device and the transmit power of the second device are obtained. Therefore, negotiation reliability is improved.

According to a second aspect, the present invention provides a switching threshold setting method. The method includes: obtaining, by a first device, a transmit power of a second device. The method also includes determining, by the first device, a switching threshold of the second device according to the transmit power of the second device, a switching threshold of the first device, and a transmit power of the first device. The method also includes sending, by the first device, the switching threshold of the second device to the second device, so that the second device sets the switching threshold of the second device, and when the second device detects that signal strength of the first device is less than the switching threshold of the second device, the second device is to release a wireless communication connection to the first device.

Herein, the switching threshold of the second device is determined by negotiation by the first device and the second device, and the switching threshold of the second device is sent to the second device, so that the second device sets the switching threshold, and the switching threshold of the second device matches the switching threshold of the first device. For a wireless access device, when the wireless access device detects that signal strength of a terminal reaches a switching threshold of the wireless access device, the wireless access device starts releasing of a wireless communication connection to the terminal. For the terminal having a roaming function, when the wireless access device detects that the signal strength of the terminal reaches the switching threshold of the wireless access device, and starts releasing of the wireless communication connection to the terminal, the terminal has detected that signal strength of the wireless access device reaches a switching threshold of the terminal, and starts a roaming process to find a target wireless access device. In this way, wireless communication continuity of the terminal in a wireless local area network is ensured, and communication quality of another terminal that establishes a wireless communication connection to the wireless access device is improved.

In a first implementation of the second aspect, the determining, by the first device, a switching threshold of the second device according to the transmit power of the second device, a switching threshold of the first device, and a transmit power of the first device includes: obtaining, by the first device, a second sum value by calculating a sum of a difference between the transmit power of the first device and the transmit power of the second device and the switching threshold of the first device; and determining, by the first device, the switching threshold of the second device according to the second sum value. In this implementation, a specific method for setting the switching threshold of the second device is provided, but the present invention is not limited thereto.

In a second implementation of the second aspect, the obtaining, by a first device, a transmit power of a second device includes: reading, by the first device, the pre-stored transmit power of the second device; or receiving, by the first device, the transmit power of the second device that is sent by the second device.

In a third implementation of the second aspect, before the obtaining, by a first device, a transmit power of a second device, the method further includes: receiving, by the first device, a second message sent by the second device, where the second message is used to request the first device to determine the switching threshold of the second device for the second device. In this implementation, the first device receives the second message that is used to request the first device to determine the switching threshold of the second device for the second device, so that it is determined that the first device is to determine the switching threshold of the second device for the second device. Therefore, negotiation reliability is improved.

In a fourth implementation of the second aspect, when the first device is a wireless access device and the second device is a terminal, before the obtaining, by a first device, a transmit power of a second device, the method further includes: sending, by the first device, a third message by means of broadcasting, where the third message indicates that the first device has a capability to determine the switching threshold of the second device for the second device. In this implementation, the wireless access device sends, using broadcasting, the third message that indicates that the wireless access device has a capability to determine the switching threshold of the terminal for the terminal, to notify terminals in a coverage area of the wireless access device that these terminals can request the wireless access device to determine switching thresholds of the terminals for the terminals.

According to a third aspect, the present invention provides a switching threshold setting apparatus. The switching threshold setting apparatus is integrated into a first device, and the switching threshold setting apparatus includes: an obtaining module, configured to obtain a switching threshold of a second device and a transmit power of the second device. The apparatus also includes a processing module, configured to determine and set a switching threshold of the first device according to the switching threshold of the second device, the transmit power of the second device, and a transmit power of the first device. The apparatus also includes a detection module, configured to detect signal strength of the second device, where the processing module is further configured to release a wireless communication connection to the second device when the signal strength that is of the second device and that is detected by the detection module is less than the switching threshold of the first device.

In this implementation, the switching threshold of the first device is determined by means of negotiation by the first device and the second device, so that the switching threshold of the first device matches the switching threshold of the second device. For a wireless access device, when the wireless access device detects that signal strength of a terminal reaches a switching threshold of the wireless access device, the wireless access device starts releasing of a wireless communication connection to the terminal. For the terminal having a roaming function, when the wireless access device detects that the signal strength of the terminal reaches the switching threshold of the wireless access device, and starts releasing of the wireless communication connection to the terminal, the terminal has detected that signal strength of the wireless access device reaches a switching threshold of the terminal, and starts a roaming process to find a target wireless access device. In this way, wireless communication continuity of the terminal in a wireless local area network is ensured, and communication quality of another terminal that establishes a wireless communication connection to the wireless access device is improved.

In a first implementation of the third aspect, the processing module is specifically configured to: obtain a first sum value by calculating a sum of a difference between the transmit power of the second device and the transmit power of the first device and the switching threshold of the second device; and determine and set the switching threshold of the first device according to the first sum value. In this implementation, a specific method for setting the switching threshold of the first device is provided, but the present invention is not limited thereto.

In a second implementation of the third aspect, when the first device is a terminal and the second device is a wireless access device, the processing module is further configured to determine and set the switching threshold of the first device to be greater than the first sum value.

On the basis of the foregoing implementation, in this implementation, the switching threshold of the first device is set to be greater than the first sum value, so that it is ensured that the terminal has roamed to a target wireless access device before the wireless access device puts the terminal offline, a problem that the terminal has not started a roaming process when the terminal is put offline by the wireless access device is avoided, and wireless communication continuity of the terminal in the wireless local area network is further ensured.

In a third implementation of the third aspect, the obtaining module is specifically configured to: read the pre-stored switching threshold of the second device and the pre-stored transmit power of the second device; or receive the switching threshold of the second device and the transmit power of the second device that are sent by the second device.

In a fourth implementation of the third aspect, the switching threshold setting apparatus further includes a sending module, configured to send a first message to the second device, where the first message is used to request the second device to send the switching threshold of the second device and the transmit power of the second device to the first device.

In this implementation, the first message that is used to request the second device to send the switching threshold of the second device and the transmit power of the second device is sent to the second device, so that the switching threshold of the second device and the transmit power of the second device are obtained. Therefore, negotiation reliability is improved.

According to a fourth aspect, the present invention provides a switching threshold setting apparatus. The switching threshold setting apparatus is integrated into a first device. The switching threshold setting apparatus includes an obtaining module, configured to obtain a transmit power of a second device. The apparatus also includes a processing module, configured to determine a switching threshold of the second device according to the transmit power of the second device, a switching threshold of the first device, and a transmit power of the first device. The apparatus also includes a sending module, configured to send the switching threshold that is of the second device and that is determined by the processing module to the second device, so that the second device sets the switching threshold of the second device, and when the second device detects that signal strength of the first device is less than the switching threshold of the second device, the second device is to release a wireless communication connection to the first device.

In this implementation, the switching threshold of the second device is determined using negotiation by the switching threshold setting apparatus and the second device, and the switching threshold of the second device is sent to the second device, so that the second device sets the switching threshold, and the switching threshold of the second device matches the switching threshold of the first device. For a wireless access device, when the wireless access device detects that signal strength of a terminal reaches a switching threshold of the wireless access device, the wireless access device starts releasing of a wireless communication connection to the terminal. For the terminal having a roaming function, when the wireless access device detects that the signal strength of the terminal reaches the switching threshold of the wireless access device, and starts releasing of the wireless communication connection to the terminal, the terminal has detected that signal strength of the wireless access device reaches a switching threshold of the terminal, and starts a roaming process to find a target wireless access device. In this way, wireless communication continuity of the terminal in a wireless local area network is ensured, and communication quality of another terminal that establishes a wireless communication connection to the wireless access device is improved.

In a first implementation of the fourth aspect, the processing module is specifically configured to: obtain a second sum value by calculating a sum of a difference between the transmit power of the first device and the transmit power of the second device and the switching threshold of the first device; and determine the switching threshold of the second device according to the second sum value. In this implementation, a specific method for setting the switching threshold of the second device is provided, but the present invention is not limited thereto.

In a second implementation of the fourth aspect, the obtaining module is specifically configured to: read the pre-stored transmit power of the second device; or receive the transmit power of the second device that is sent by the second device.

In a third implementation of the fourth aspect, the switching threshold setting apparatus further includes a receiving module, configured to receive a second message sent by the second device, where the second message is used to request the switching threshold setting apparatus to determine the switching threshold of the second device for the second device. In this implementation, the switching threshold setting apparatus receives the second message that is used to request the first device to determine the switching threshold of the second device for the second device, so that it is determined that the switching threshold setting apparatus is to determine the switching threshold of the second device for the second device. Therefore, negotiation reliability is improved.

In a fourth implementation of the fourth aspect, when the first device is a wireless access device and the second device is a terminal, the sending module is further configured to send a third message by means of broadcasting, where the third message is used to indicate that the first device has a capability to determine the switching threshold of the second device for the second device. In this implementation, the wireless access device sends, by means of broadcasting, the third message that is used to indicate that the wireless access device has a capability to determine the switching threshold of the terminal for the terminal, to notify terminals in a coverage area of the wireless access device that these terminals can request the wireless access device to determine switching thresholds of the terminals for the terminals.

According to a fifth aspect, the present invention provides a terminal. The terminal includes a processor and a memory that is configured to store an executable instruction of the processor. The processor is configured to execute the method according to any one of the first aspect, and the terminal is the first device in the method.

According to a sixth aspect, the present invention provides a wireless access device. The wireless access device includes a processor and a memory that is configured to store an executable instruction of the processor. The processor is configured to execute the method according to any one of the second aspect, and the wireless access device is the first device in the method.

In any implementation above, a transmit power includes a maximum transmit power and a current transmit power. That is, the transmit power of the first device is a maximum transmit power of the first device or a current transmit power of the first device, and the transmit power of the second device is a maximum transmit power of the second device or a current transmit power of the second device.

These aspects and other aspects of the present invention will be simpler and easier to understand in descriptions of the following (multiple) embodiments.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
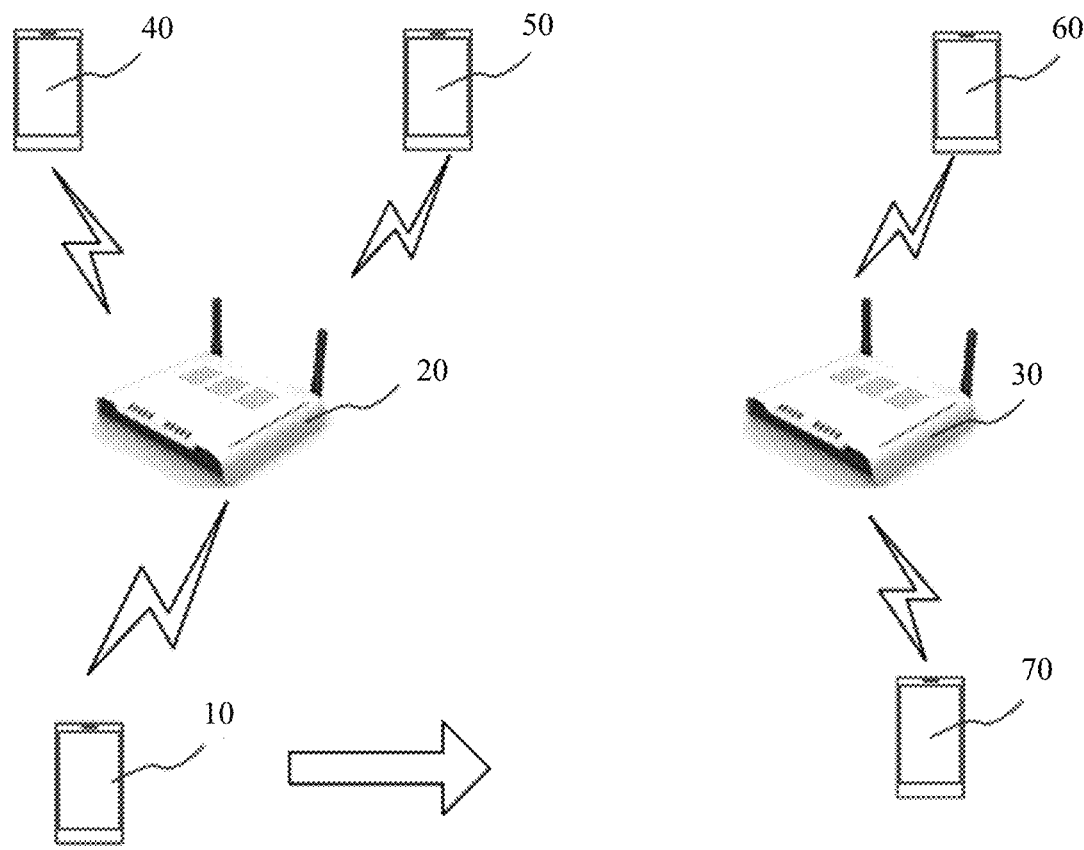
FIG. 1 is an example diagram of an application scenario according to the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

For ease of understanding, basic concepts in the embodiments of the present invention are first explained.

Wireless access device: providing wireless access to a wireless local area network (WLAN), that is, Wi-Fi, and being capable of receiving an association request sent by a terminal, establishing a wireless communication connection to the terminal, and providing a communication service to the terminal. When signal strength of the terminal that establishes the wireless communication connection to the wireless access device becomes weak and deceases to a switching threshold of the wireless access device, communication quality of the terminal is affected. In addition, to maintain the wireless communication connection to the terminal, the wireless access device needs to decrease an encoding rate, and may decrease from a high communication rate standard such as the 802.11ac or the 802.11n to the 802.11b communications standard, and therefore, communication efficiency of another terminal that establishes a wireless communication connection to the wireless access device is decreased. Therefore, to maintain communication quality of an entire wireless network, the wireless access device may start a process of putting the terminal offline to release the wireless communication connection to the terminal. The process in which the wireless access device puts the terminal that has established the wireless communication connection offline may be releasing the wireless communication connection to the terminal by using a standard offline putting program, for example, sending a deassociation message or a deauthentication message or another message; or may be that the wireless access device directly deletes stored wireless communication connection information of the terminal, or another method that can release an association with the terminal.

Terminal: a terminal device that has a Wi-Fi connection capability, and being capable of establishing a wireless communication connection to a wireless access device to implement network access. When the terminal detects that signal strength of the wireless access device that establishes the wireless communication connection to the terminal decreases to a switching threshold of the terminal, the terminal may start a program of switching between wireless access devices. Specifically, the terminal scans another surrounding wireless access device, detects a target wireless access device that can establish a wireless communication connection, and switches from the current wireless access device to which the wireless communication connection is established to the target wireless access device, to continue performing network access. The program of switching between wireless access devices may be maintaining service continuity or may not be maintaining service continuity, and this is not limited in the present invention.

Referring to FIG. 1, an application scenario of an embodiment of the present invention is described below.

FIG. 1 is an example diagram of an application scenario according to the present invention. As shown in FIG. 1, a terminal 10 and a wireless access device 20 establish a wireless communication connection. The terminal 10 is in a moving state, that is, a location of the terminal 10 relative to the wireless access device 20 frequently changes. An arrow represents a moving direction of the terminal 10.

In this moving process, the terminal 10 constantly detects signal strength of the wireless access device 20. When the terminal 10 detects that the signal strength of the wireless access device 20 becomes weak and is less than a switching threshold of the terminal 10, the terminal 10 starts a roaming process and scans signal strength of a wireless access device around the terminal 10. When detecting another wireless access device (herein, for example, the another wireless access device is a wireless access device 30) whose signal strength is relatively strong, the terminal 10 switches from the wireless access device 20 to the wireless access device 30, that is, the terminal 10 releases the wireless communication connection to the wireless access device 20 and establishes a wireless communication connection to the wireless access device 30.

In addition, in this moving process, the wireless access device 20 also constantly detects signal strength of the terminal 10. When detecting that the signal strength of the terminal 10 is less than a switching threshold of the wireless access device 20, the wireless access device 20 starts a process of putting the terminal 10 offline to release the wireless communication connection to the terminal 10. Therefore, before the wireless access device 20 releases the wireless communication connection to the terminal 10, the terminal 10 needs to find the wireless access device 30 in the foregoing roaming process and establish the wireless communication connection to the wireless access device 30, so as to ensure communication continuity.

With reference to the scenario shown in FIG. 1, the embodiments of the present invention provide a switching threshold setting method and apparatus, and a device, applied to a wireless local area network. A wireless access device and a terminal determine respective switching thresholds by means of negotiation, so that a switching threshold of the wireless access device matches a switching threshold of the terminal. For the wireless access device, when detecting that signal strength of the terminal reaches the switching threshold of the wireless access device, the wireless access device starts releasing of a wireless communication connection to the terminal. For the terminal having a roaming function, before the wireless access device detects that the signal strength of the terminal reaches the switching threshold of the wireless access device, and starts releasing of the wireless communication connection to the terminal, the terminal has detected that signal strength of the wireless access device reaches the switching threshold of the terminal, and the terminal starts a roaming process to switch between wireless access devices. In this way, the following problems are avoided: The wireless access device has put the terminal offline before the terminal starts roaming to switch between wireless access devices, and communication quality of another terminal that establishes a wireless communication connection to the wireless access device is poor because the switching threshold of the wireless access device is set to be excessively low.

The switching threshold setting method in the embodiments of the present invention includes the following scenarios. In a first scenario, a terminal adjusts a switching threshold of the terminal according to a switching threshold of a wireless access device. In a second scenario, a wireless access device sets, according to a switching threshold of a terminal, a switching threshold that is of the wireless access device and that is corresponding to the terminal. In a third scenario, a terminal determines, for a wireless access device connected to the terminal and according to a switching threshold of the terminal, a switching threshold that is of the wireless access device and that is corresponding to the terminal. In a fourth scenario, a wireless access device determines, for a terminal connected to the wireless access device, a switching threshold of the terminal according to a switching threshold of the wireless access device.

It should be noted that a wireless access device may be wirelessly communicatively connected to multiple terminals, and switching thresholds of the wireless access device that are corresponding to the terminals may be the same or may be different. This is not limited in the embodiments of the present invention. For example, as shown in FIG. 1, the wireless access device 20 further establishes wireless communication connections to a terminal 40 and a terminal 50, and the wireless access device 30 establishes wireless communication connections to a terminal 60 and a terminal 70. In addition, the switching threshold setting method provided in the embodiments of the present invention may be applied after a terminal and a wireless access device establish a wireless communication connection, or in a process in which a terminal and a wireless access device establish a wireless communication connection.

The following separately describes in detail these scenarios.

Figure 2:
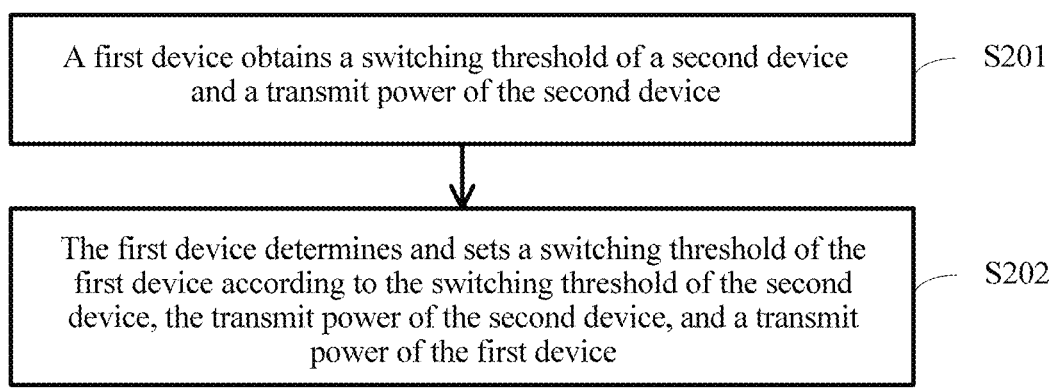
FIG. 2 is a schematic flowchart of Embodiment 1 of a switching threshold setting method according to the present invention.

FIG. 2 is a schematic flowchart of Embodiment 1 of a switching threshold setting method according to the present invention. As shown in FIG. 2, the method includes the following steps.

S201. A first device obtains a switching threshold of a second device and a transmit power of the second device.

S202. The first device determines and sets a switching threshold of the first device according to the switching threshold of the second device, the transmit power of the second device, and a transmit power of the first device.

When the first device detects that signal strength of the second device is less than the switching threshold of the first device, the first device is to release a wireless communication connection to the second device.

In this embodiment, the first device and the second device are separately a terminal and a wireless access device. That is, when the first device is a terminal, the second device is a wireless access device, or when the first device is a wireless access device, the second device is a terminal. Therefore, the procedure shown in FIG. 2 includes the foregoing first scenario and the foregoing second scenario.

Specifically, this embodiment of the present invention is implemented after the first device and the second device establish the wireless communication connection, or in a process in which the first device and the second device establish the wireless communication connection.

The first device may obtain the switching threshold of the second device and the transmit power of the second device in multiple manners. For example, in a manner 1, the first device may read the pre-stored switching threshold of the second device and the pre-stored transmit power of the second device, that is, the first device locally stores the switching threshold of the second device and the transmit power of the second device. Alternatively, in a manner 2, the first device receives the switching threshold of the second device and the transmit power of the second device that are sent by the second device.

In the manner 2, the switching threshold of the second device and the transmit power of the second device may be carried in a message for transmission, and the message may be a message generated by extending a proprietary protocol. However, this embodiment of the present invention is not limited thereto. The message may be transmitted in a broadcast or unicast manner, and the message is, for example, a beacon frame message; or may be transmitted in a request/response manner, and in this case, before the first device obtains the switching threshold of the second device and the transmit power of the second device, the method may further include: sending, by the first device, a first message to the second device, where the first message is used to request the second device to send the switching threshold of the second device and the transmit power of the second device to the first device; or may be transmitted in an active initiation manner, or the like.

S202 may be specifically: The first device obtains a first sum value by calculating a sum of a difference between the transmit power of the second device and the transmit power of the first device and the switching threshold of the second device; and the first device determines and sets the switching threshold of the first device according to the first sum value.

Specifically, L(d) is used to represent a link loss when a distance between the first device and the second device is d, and a unit of L(d) is dB. L(d) is related to factors such as a loss factor, a carrier frequency, and a distance. However, an uplink (Uplink, UL for short) and a downlink (DL) in a WLAN generally use a same frequency band, and UL/DL channels between the first device and the second device may be approximately considered to have a same link loss because of channel reciprocity. Therefore, L(d) is mainly related to the distance.

For example, it is assumed that $T_1$ represents the switching threshold of the first device, $T_2$ represents the switching threshold of the second device, $P_1$ represents the transmit power of the first device, and $P_2$ represents the transmit power of the second device. A unit of a parameter represented by each symbol may be decibel-milliwatt (dBm).

When the first device is far away from the second device, and the distance between the first device and the second device reaches $d_{max}$, the second device detects that signal strength of the first device exactly reaches the switching threshold $T_2$ of the second device. That is, $$P_1 - L(d_{max}) = T_2$$

In this case, if the signal strength that is of the second device and that is detected by the first device also exactly reaches the switching threshold $T_1$ of the first device, that is, $$P_2 - L(d_{max}) = T_1$$

It is learned by means of calculation by combining the foregoing two formulas that $$T_1 = T_2 + (P_2 - P_1) \text{ or } T_2 = T_1 + (P_1 - P_2).$$

Obviously, the switching threshold of the first device is related only to the transmit power of the second device, the switching threshold of the second device, and the transmit power of the first device, and is unrelated to an initially set switching threshold of the first device.

Therefore, the switching threshold of the first device may be obtained according to $$T_1 = T_2 + (P_2 - P_1)$$

According to this embodiment of the present invention, the switching threshold of the first device is determined by means of negotiation by the first device and the second device, so that the switching threshold of the first device matches the switching threshold of the second device. For a wireless access device, when the wireless access device detects that signal strength of a terminal reaches a switching threshold of the wireless access device, the wireless access device starts releasing of a wireless communication connection to the terminal. For the terminal having a roaming function, when the wireless access device detects that the signal strength of the terminal reaches the switching threshold of the wireless access device, and starts releasing of the wireless communication connection to the terminal, the terminal has detected that signal strength of the wireless access device reaches a switching threshold of the terminal, and starts a roaming process to find a target wireless access device. In this way, wireless communication continuity of the terminal in the wireless local area network is ensured, and communication quality of another terminal that establishes a wireless communication connection to the wireless access device is improved.

Figure 3:
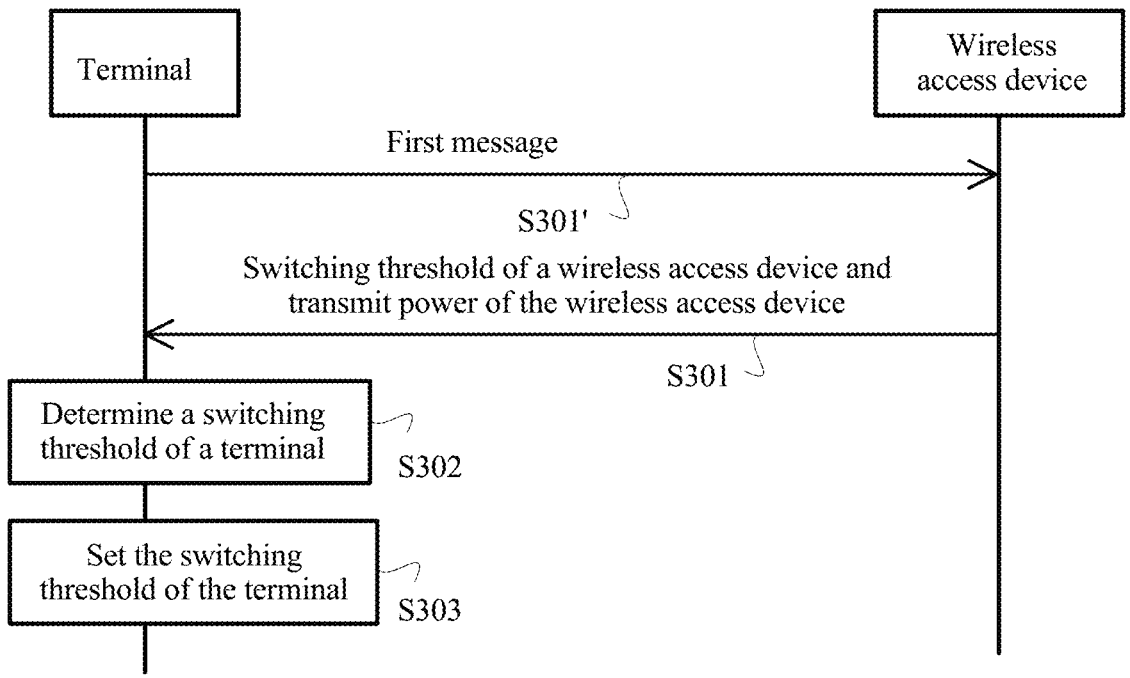
FIG. 3 is a signaling interworking diagram of a first scenario of a switching threshold setting method according to the present invention.

FIG. 3 is a signaling interworking diagram of a first scenario of a switching threshold setting method according to the present invention. In an embodiment shown in FIG. 3, the first scenario is described by using an example in which a terminal receives a switching threshold of a wireless access device and a transmit power of the wireless access device that are sent by the wireless access device.

Referring to FIG. 3, the switching threshold setting method may include the following steps.

S301. The terminal receives a switching threshold of the wireless access device and a transmit power of the wireless access device that are sent by the wireless access device.

Optionally, before S301, the method may further include S301': The terminal sends a first message to the wireless access device. The first message is used to request the wireless access device to send the switching threshold of the wireless access device and the transmit power of the wireless access device to the terminal. The first message may be an association request message, a probe request message, an authentication request message, or the like, and this is not limited in this embodiment of the present invention. Correspondingly, the switching threshold of the wireless access device and the transmit power of the wireless access device that are sent by the wireless access device may be carried in a response message, and the response message may be an association response message, a probe response message, an authentication response message, or the like.

S302. The terminal determines a switching threshold of the terminal according to a transmit power of the terminal, the switching threshold of the wireless access device, and the transmit power of the wireless access device.

S303. The terminal sets the switching threshold of the terminal.

Figure 4:
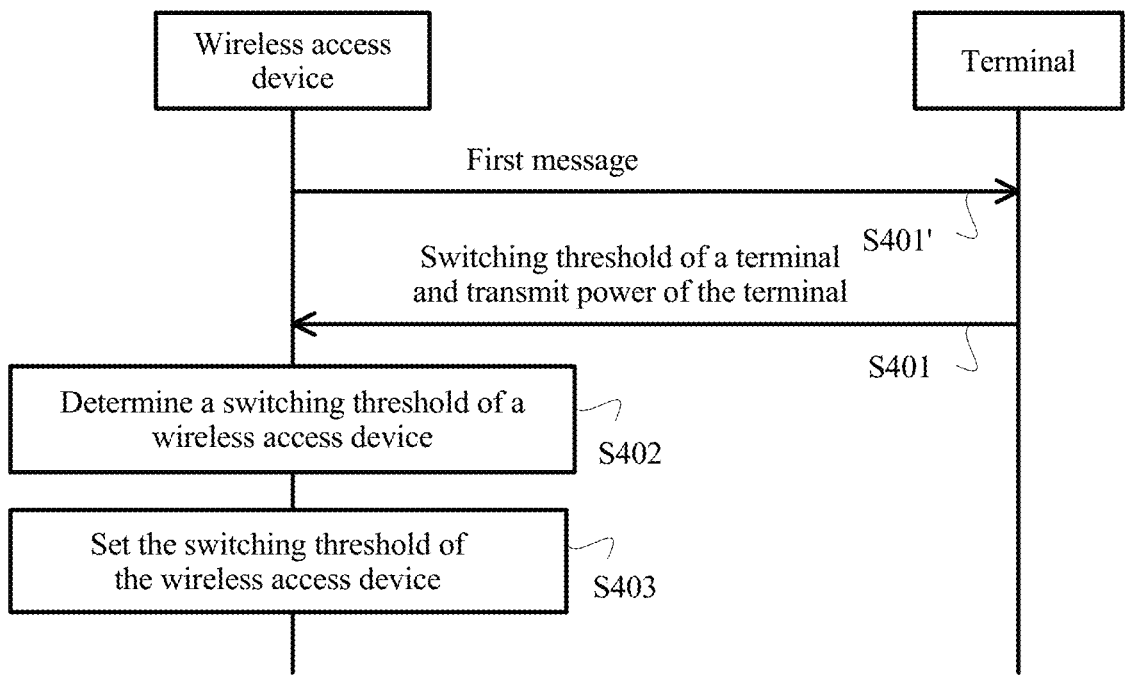
FIG. 4 is a signaling interworking diagram of a second scenario of a switching threshold setting method according to the present invention.

FIG. 4 is a signaling interworking diagram of a second scenario of a switching threshold setting method according to the present invention. In an embodiment shown in FIG. 4, the second scenario is described by using an example in which a wireless access device receives a switching threshold of a terminal and a transmit power of the terminal that are sent by the terminal.

Referring to FIG. 4, the switching threshold setting method may include the following steps.

S401. The wireless access device receives a switching threshold of the terminal and a transmit power of the terminal that are sent by the terminal.

Optionally, before S401, the method may further include S401': The wireless access device sends a first message to the terminal. The first message is used to request the terminal to send the switching threshold of the terminal and the transmit power of the terminal to the wireless access device. The first message may be an association response message, a probe response message, an authentication response message, or the like, and this is not limited in this embodiment of the present invention. Correspondingly, the switching threshold of the terminal and the transmit power of the terminal that are sent by the terminal may be carried in a request message. The request message may be an association request message, a probe request message, an authentication request message, or the like, and this is not limited in this embodiment of the present invention.

S402. The wireless access device determines a switching threshold of the wireless access device according to a transmit power of the wireless access device, the switching threshold of the terminal, and the transmit power of the terminal.

S403. The wireless access device sets the switching threshold of the wireless access device.

Further, on the basis of the foregoing embodiment, when the first device is a terminal and the second device is a wireless access device, that the first device determines and sets the switching threshold of the first device according to the first sum value may include: The first device determines and sets the switching threshold of the first device to be greater than the first sum value. That is, when the switching threshold of the terminal is set, an actually set switching threshold may be slightly greater than a calculated switching threshold of the terminal. In this way, it can be ensured that the terminal has roamed to a target wireless access device before the wireless access device puts the terminal offline, a problem that the terminal has not started a roaming process when the terminal is put offline by the wireless access device is avoided, and wireless communication continuity of the terminal in the wireless local area network is further ensured.

After setting the switching threshold of the first device, the first device constantly detects, in a subsequent process of communicating with the second device, signal strength of a signal sent by the second device. When the signal strength of the signal sent by the second device is less than the switching threshold of the first device, the first device is to release the wireless communication connection to the second device.

Figure 5:
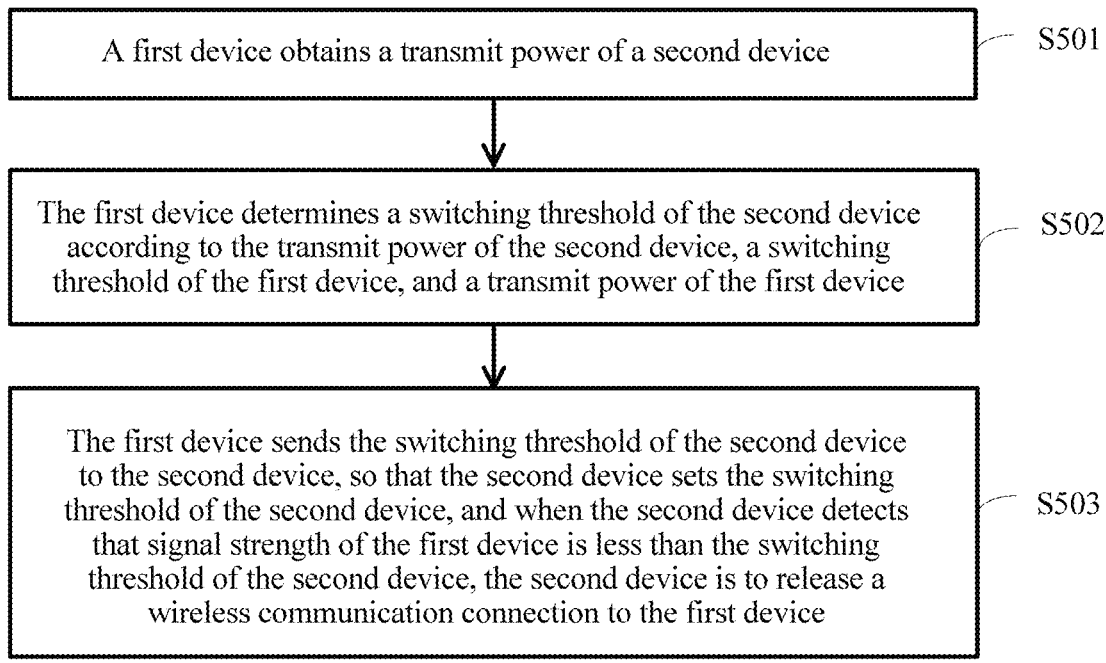
FIG. 5 is a schematic flowchart of Embodiment 2 of a switching threshold setting method according to the present invention.

FIG. 5 is a schematic flowchart of Embodiment 2 of a switching threshold setting method according to the present invention. As shown in FIG. 5, the method includes the following steps.

S501. A first device obtains a transmit power of a second device.

S502. The first device determines a switching threshold of the second device according to the transmit power of the second device, a switching threshold of the first device, and a transmit power of the first device.

S503. The first device sends the switching threshold of the second device to the second device, so that the second device sets the switching threshold of the second device, and when the second device detects that signal strength of the first device is less than the switching threshold of the second device, the second device is to release a wireless communication connection to the first device.

A difference between this embodiment and the embodiment shown in FIG. 2 is: In the embodiment shown in FIG. 2, the first device determines the switching threshold of the first device according to the transmit power of the first device, the transmit power of the second device, and the switching threshold of the second device; in this embodiment, the first device determines the switching threshold of the second device according to the transmit power of the second device, the switching threshold of the first device, and the transmit power of the first device, and then the first device sends the switching threshold of the second device to the second device.

In this embodiment, the first device and the second device are separately a terminal and a wireless access device. That is, when the first device is a terminal, the second device is a wireless access device, or when the first device is a wireless access device, the second device is a terminal.

Therefore, the procedure shown in FIG. 5 includes the foregoing third scenario and the foregoing fourth scenario.

Figure 6:
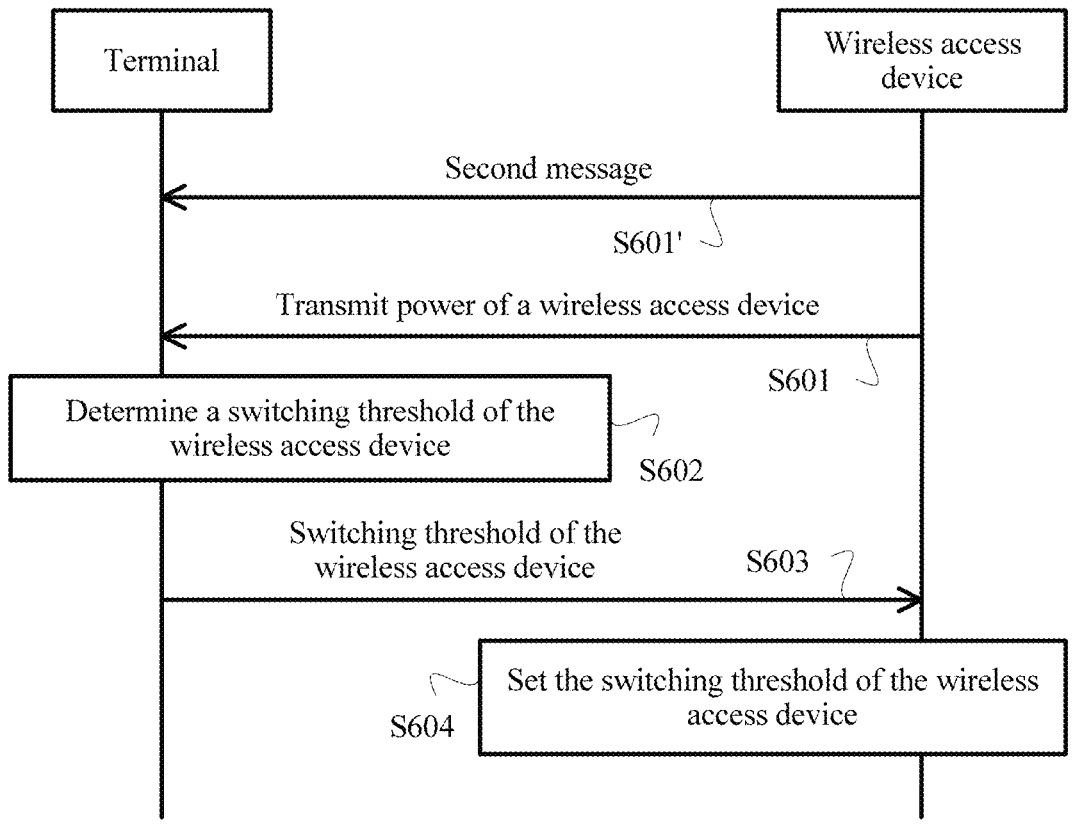
FIG. 6 is a signaling interworking diagram of a third scenario of a switching threshold setting method according to the present invention.

Referring to FIG. 6, the third scenario is described in detail.

FIG. 6 is a signaling interworking diagram of a third scenario of a switching threshold setting method according to the present invention. As shown in FIG. 6, the method includes the following steps.

S601. A terminal receives a transmit power of a wireless access device that is sent by the wireless access device.

Alternatively, this step may be that the terminal reads the pre-stored transmit power of the wireless access device.

The transmit power of the wireless access device may be carried in various messages sent by the wireless access device, so as to be sent to the terminal. For example, the wireless access device adds the transmit power of the wireless access device to an association response message or a probe response message or an authentication response message, and sends the message to the terminal.

Optionally, before S601, the method may further include S601': The terminal receives a second message sent by the wireless access device. The second message is used to request the terminal to determine a switching threshold of the wireless access device for the wireless access device.

S602. The terminal determines a switching threshold of the wireless access device according to the transmit power of the wireless access device, a switching threshold of the terminal, and a transmit power of the terminal.

S602 may be specifically: The terminal obtains a second sum value by calculating a sum of a difference between the transmit power of the wireless access device and the transmit power of the wireless access device and the switching threshold of the terminal; and the terminal determines the switching threshold of the wireless access device according to the second sum value.

For example, the terminal obtains the switching threshold of the wireless access device by using a formula $T_2=T_1+(P_1-P_2)$. For a specific meaning of each symbol in the formula, refer to the foregoing embodiment, and details are not described herein again.

S603. The terminal sends the switching threshold of the wireless access device to the wireless access device.

S604. The wireless access device sets the switching threshold of the wireless access device.

When the wireless access device detects that signal strength of the terminal is less than the switching threshold of the wireless access device, the wireless access device is to release a wireless communication connection to the terminal.

In this scenario, the wireless access device sends the transmit power of the wireless access device to the terminal. The terminal determines the switching threshold of the wireless access device for the wireless access device connected to the terminal, and returns the switching threshold of the wireless access device to the wireless access device.

Figure 7:
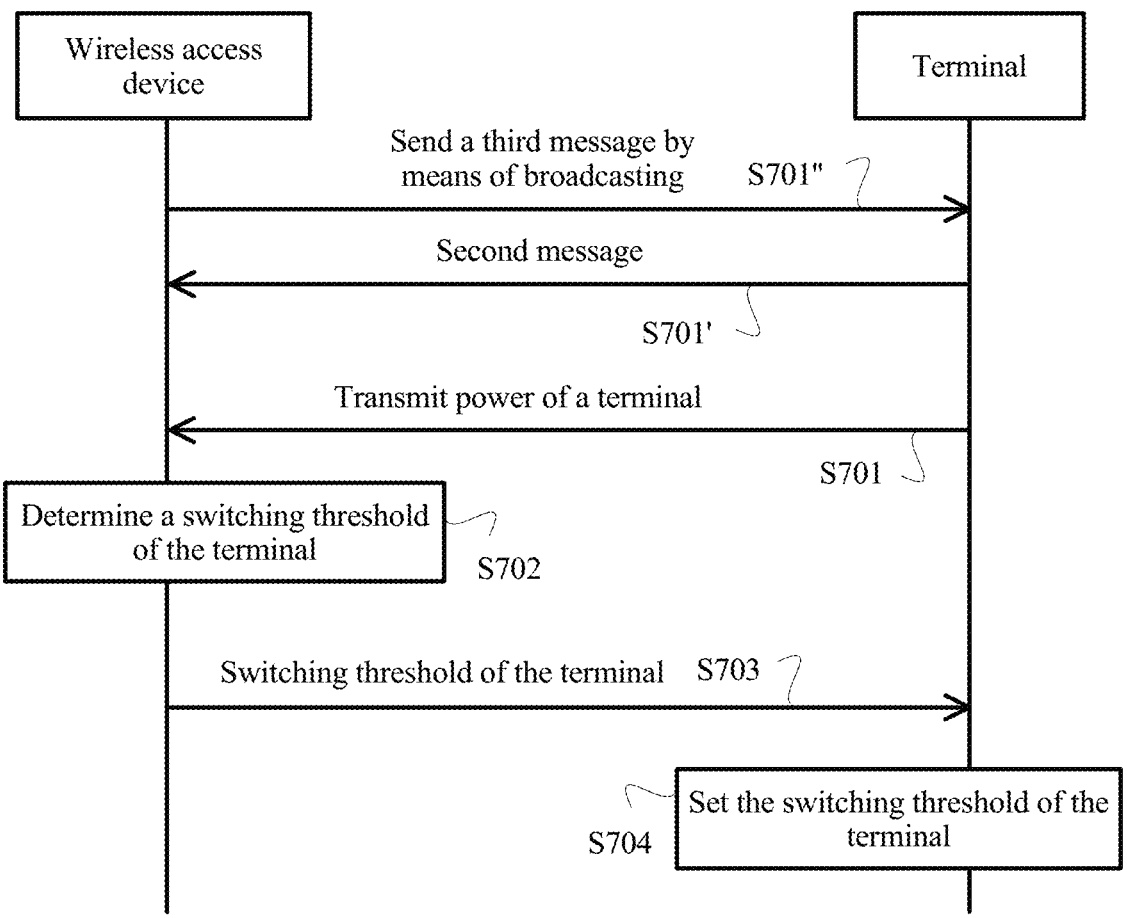
FIG. 7 is a signaling interworking diagram of a fourth scenario of a switching threshold setting method according to the present invention.

FIG. 7 is a signaling interworking diagram of a fourth scenario of a switching threshold setting method according to the present invention. As shown in FIG. 7, the method includes the following steps.

S701. A wireless access device receives a transmit power of a terminal that is sent by the terminal.

Alternatively, this step may be that the wireless access device reads the pre-stored transmit power of the terminal.

The transmit power of the terminal may be carried in various messages sent by the terminal, so as to be sent to the wireless access device. For example, the terminal adds the transmit power of the terminal to an association request message or a probe request message or an authentication request message, and sends the message to the wireless access device.

Optionally, before S701, the method may further include S701': The wireless access device receives a second message sent by the terminal. The second message is used to request the wireless access device to determine a switching threshold of the terminal for the terminal.

Before S701, the method may further include S701": The wireless access device sends a third message by means of broadcasting. The third message is used to indicate that the wireless access device has a capability to determine the switching threshold of the terminal for the terminal.

S702. The wireless access device determines a switching threshold of the terminal according to the transmit power of the terminal, a switching threshold of the wireless access device, and a transmit power of the wireless access device.

Specifically, the wireless access device obtains a second sum value by calculating a sum of a difference between the transmit power of the wireless access device and the transmit power of the terminal and the switching threshold of the wireless access device; and the wireless access device determines the switching threshold of the terminal according to the second sum value.

For example, the wireless access device obtains the switching threshold of the terminal by using a formula $T_2=T_1+(P_1-P_2)$. For a specific meaning of each symbol in the formula, refer to the foregoing embodiment, and details are not described herein again.

S703. The wireless access device sends the switching threshold of the terminal to the terminal.

S704. The terminal sets the switching threshold of the terminal.

When the terminal detects that signal strength of the wireless access device is less than the switching threshold of the terminal, the terminal is to release a wireless communication connection to the wireless access device.

Correspondingly, after receiving the switching threshold of the terminal that is sent by the wireless access device, the terminal sets the switching threshold of the terminal by using the switching threshold of the terminal that is sent by the wireless access device, and constantly detects, in a subsequent process of communicating with the wireless access device, signal strength of a signal sent by the wireless access device. When the signal strength of the wireless access device decreases to the switching threshold of the terminal, the terminal starts roaming.

In this scenario, the switching threshold of the terminal that is set by the terminal may be greater than the switching threshold of the terminal that is sent by the wireless access device to the terminal. That is, when the switching threshold of the terminal is set, an actually set switching threshold may be slightly greater than the switching threshold that is of the terminal and that is determined by the wireless access device. In this way, it can be ensured that the terminal has roamed to a target wireless access device before the wireless access device puts the terminal offline, a problem that the terminal has not started a roaming process when the terminal is put offline by the wireless access device is avoided, and wireless communication continuity of the terminal in a wireless local area network is further ensured.

In the foregoing two scenarios, the switching threshold of the second device is determined by means of negotiation by the first device and the second device, and the switching threshold of the second device is sent to the second device, so that the second device sets the switching threshold, and the switching threshold of the second device matches the switching threshold of the first device. For a wireless access device, when the wireless access device detects that signal strength of a terminal reaches a switching threshold of the wireless access device, the wireless access device starts releasing of a wireless communication connection to the terminal. For the terminal having a roaming function, when the wireless access device detects that the signal strength of the terminal reaches the switching threshold of the wireless access device, and starts releasing of the wireless communication connection to the terminal, the terminal has detected that signal strength of the wireless access device reaches a switching threshold of the terminal, and starts a roaming process to find a target wireless access device. In this way, wireless communication continuity of the terminal in a wireless local area network is ensured, and communication quality of another terminal that establishes a wireless communication connection to the wireless access device is improved.

It should be further noted that in any embodiment of the present invention, alternatively, that the first device obtains the switching threshold of the second device and the transmit power of the second device may be specifically: separately obtaining the switching threshold of the second device and the transmit power of the second device from two messages sent by the second device. The two messages may be the same or may be different. For example, when the first device is a terminal, one of the two messages is an association request message, and the other is probe request information.

In addition, the transmit power of the first device may be a maximum transmit power of the first device or a current transmit power of the first device. Likewise, the transmit power of the second device may be a maximum transmit power of the second device or a current transmit power of the second device. This is not limited in this embodiment of the present invention.

It is mentioned in the foregoing embodiment that the transmit power of the second device and the switching threshold of the second device may be carried by using the message generated by extending the proprietary protocol. Therefore, in a specific implementation process, if the proprietary protocol is formulated, a vendor specific information element (Vendor Specific IE) identifier, that is, an OUI, may be carried in a related message. For example, the OUI of Huawei is oo-Eo-FC HUAWEI TECHNOLOGIES CO., LTD. In addition, because multiple proprietary protocols may be extended by using a same OUI, in this embodiment of the present invention, a switching threshold may be further extended and defined in an organization identifier part. Table 1 shows an example.

TABLE 1

| Attribute name | M/O | Permissible value |
|---|---|---|
| OUI | M | 3 bytes, 00E0FC |
| Switching threshold (Switching Threshold) | M | 4 bytes, 0x90000001 |
| Version (Version) | M | 2 bytes, 0x0100 |
| Request type (Request Type) | M | 1 byte, 0x01 (request), 0x02 (response) |
| Maximum power (Maximum Power) | M | 4 bytes, maximum transmit power |
| Threshold (Threshold) | M | 4 bytes, a specific value of a threshold |

Referring to Table 1, if the message generated by extending the proprietary protocol is sent by the wireless access device, the switching threshold is the switching threshold of the wireless access device. If the message generated by extending the proprietary protocol is sent by the terminal, the switching threshold is the switching threshold of the terminal. "Request type" is used to represent a type of the message, and the request type includes a request and a response. "Maximum power" is used to represent a maximum transmit power of a device that sends the message.

In addition, in addition to formulating the foregoing method into a proprietary protocol, a characteristic corresponding to the foregoing method may be formulated in a general standard. For example, a wireless access device switching IE is newly defined. Specifically, referring to Table 2, a specific wireless access device switching IE is carried in a message exchanged between the wireless access device and the terminal, to implement threshold information negotiation.

TABLE 2

| Attribute name | M/O | Permissible value |
|---|---|---|
| Request type (Request Type) | M | 1 byte, 0x01 (request), 0x02 (response) |
| Maximum power (Maximum Power) | M | 4 bytes, maximum transmit power |
| Threshold (Threshold) | M | 4 bytes, a specific value of a threshold |

The foregoing method may be dynamically applied to a case in which wireless access devices of different density are deployed in an enterprise scenario, so that the terminal can switch between different wireless access devices more smoothly, and user experience is improved.

Figure 8:
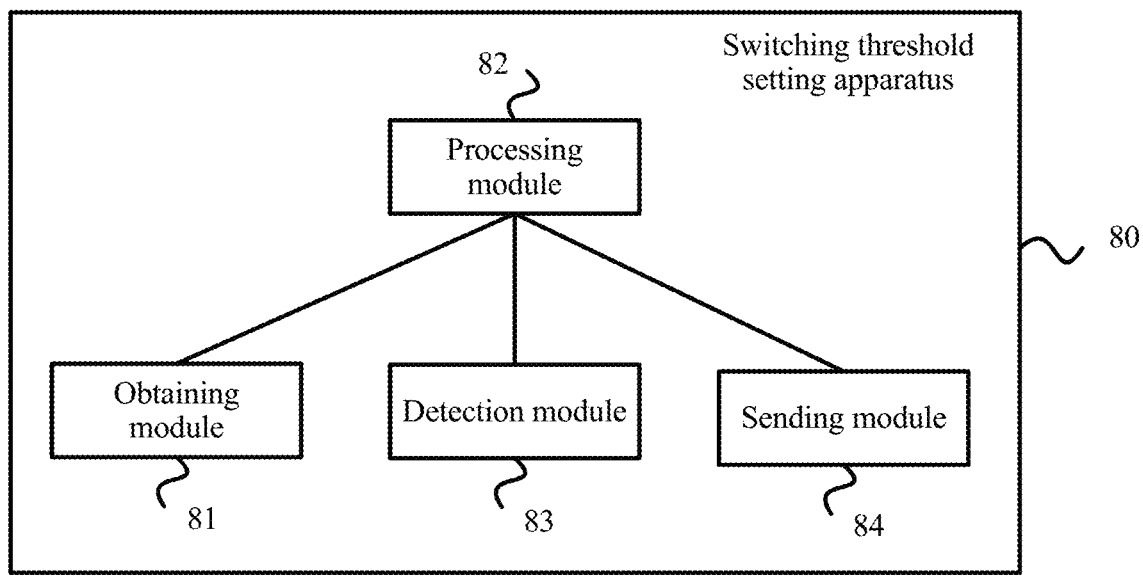
FIG. 8 is a schematic structural diagram of Embodiment 1 of a switching threshold setting apparatus according to the present invention.

FIG. 8 is a schematic structural diagram of Embodiment 1 of a switching threshold setting apparatus according to the present invention. This embodiment of the present invention provides a switching threshold setting apparatus, and the switching threshold setting apparatus is integrated into a first device. As shown in FIG. 8, a switching threshold setting apparatus 80 includes an obtaining module 81, a processing module 82, and a detection module 83.

The obtaining module 81 is configured to obtain a switching threshold of a second device and a transmit power of the second device. The processing module 82 is configured to determine and set a switching threshold of the first device according to the switching threshold of the second device, the transmit power of the second device, and a transmit power of the first device. The detection module 83 is configured to detect signal strength of the second device. The processing module 82 is further configured to release a wireless communication connection to the second device when the signal strength that is of the second device and that is detected by the detection module 83 is less than the switching threshold of the first device.

The apparatus in this embodiment may be configured to execute the technical solution in the method embodiment shown in FIG. 2. An implementation principle and a technical effect of the apparatus are similar to those of the method embodiment shown in FIG. 2, and details are not described herein again.

Optionally, when being configured to determine and set the switching threshold of the first device according to the switching threshold of the second device, the transmit power of the second device, and the transmit power of the first device, the processing module 82 may be specifically configured to: obtain a first sum value by calculating a sum of a difference between the transmit power of the second device and the transmit power of the first device and the switching threshold of the second device; and determine and set the switching threshold of the first device according to the first sum value.

When the first device is a terminal and the second device is a wireless access device, the processing module 82 may be further configured to determine and set the switching threshold of the first device to be greater than the first sum value.

On the basis of the foregoing embodiment, in this embodiment, the switching threshold of the first device is set to be greater than the first sum value, so that it is ensured that the terminal has roamed to a target wireless access device before the wireless access device puts the terminal offline, a problem that the terminal has not started a roaming process when the terminal is put offline by the wireless access device is avoided, and wireless communication continuity of the terminal in a wireless local area network is further ensured.

On the basis of the foregoing embodiment, in an implementation, the obtaining module 81 may be specifically configured to read the pre-stored switching threshold of the second device and the pre-stored transmit power of the second device. In another implementation, the obtaining module 81 may be specifically configured to receive the switching threshold of the second device and the transmit power of the second device that are sent by the second device.

Optionally, the switching threshold setting apparatus 80 may further include a sending module 84. The sending module 84 may be configured to send a first message to the second device. The first message is used to request the second device to send the switching threshold of the second device and the transmit power of the second device to the first device. In this embodiment, the first message that is used to request the second device to send the switching threshold of the second device and the transmit power of the second device is sent to the second device, so that the switching threshold of the second device and the transmit power of the second device are obtained. Therefore, negotiation reliability is improved.

In this embodiment, a function of the obtaining module 81 may be specifically implemented by using an input device and a processor in the first device, functions of the processing module 82 and the detection module 83 may be specifically implemented by using the processor in the first device, and a function of the sending module 84 may be specifically implemented by using an output device in the first device.

Figure 9:
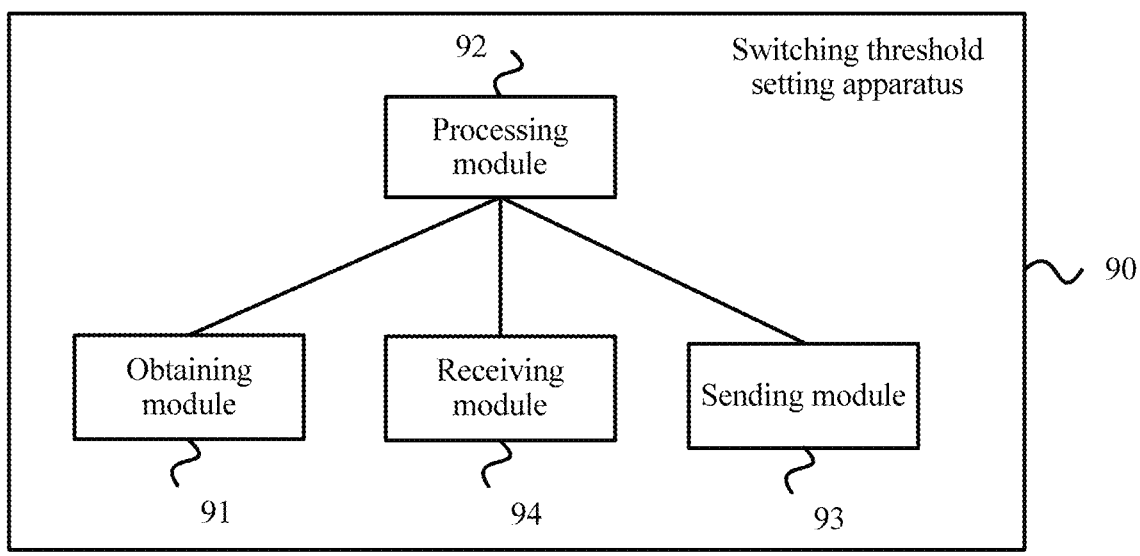
FIG. 9 is a schematic structural diagram of Embodiment 2 of a switching threshold setting apparatus according to the present invention.

FIG. 9 is a schematic structural diagram of Embodiment 2 of a switching threshold setting apparatus according to the present invention. This embodiment of the present invention provides a switching threshold setting apparatus, and the switching threshold setting apparatus is integrated into a first device. As shown in FIG. 9, a switching threshold setting apparatus 90 includes an obtaining module 91, a processing module 92, and a sending module 93.

The obtaining module 91 is configured to obtain a transmit power of a second device. The processing module 92 is configured to determine a switching threshold of the second device according to the transmit power of the second device, a switching threshold of the first device, and a transmit power of the first device. The sending module 93 is configured to send the switching threshold that is of the second device and that is determined by the processing module to the second device, so that the second device sets the switching threshold of the second device, and when the second device detects that signal strength of the first device is less than the switching threshold of the second device, the second device is to release a wireless communication connection to the first device.

The apparatus in this embodiment may be configured to execute the technical solution in the method embodiment shown in FIG. 5. An implementation principle and a technical effect of the apparatus are similar to those of the method embodiment shown in FIG. 5, and details are not described herein again.

In an optional implementation of the present invention, the processing module 92 may be specifically configured to: obtain a second sum value by calculating a sum of a difference between the transmit power of the first device and the transmit power of the second device and the switching threshold of the first device; and determine the switching threshold of the second device according to the second sum value.

The obtaining module 91 may be specifically configured to: read the pre-stored transmit power of the second device; or receive the transmit power of the second device that is sent by the second device.

Optionally, the switching threshold setting apparatus 90 may further include a receiving module 94. The receiving module 94 is configured to receive a second message sent by the second device. The second message is used to request the switching threshold setting apparatus 90 to determine the switching threshold of the second device for the second device.

In addition, when the first device is a wireless access device and the second device is a terminal, the sending module 93 may be further configured to send a third message by means of broadcasting. The third message is used to indicate that the first device has a capability to determine the switching threshold of the second device for the second device.

In this embodiment, a function of the obtaining module 91 may be specifically implemented by using an input device and a processor in the first device, a function of the processing module 92 may be specifically implemented by using the processor in the first device, a function of the sending module 93 may be specifically implemented by using an output device in the first device, and a function of the receiving module 94 may be specifically implemented by using the input device in the first device.

Figure 10:
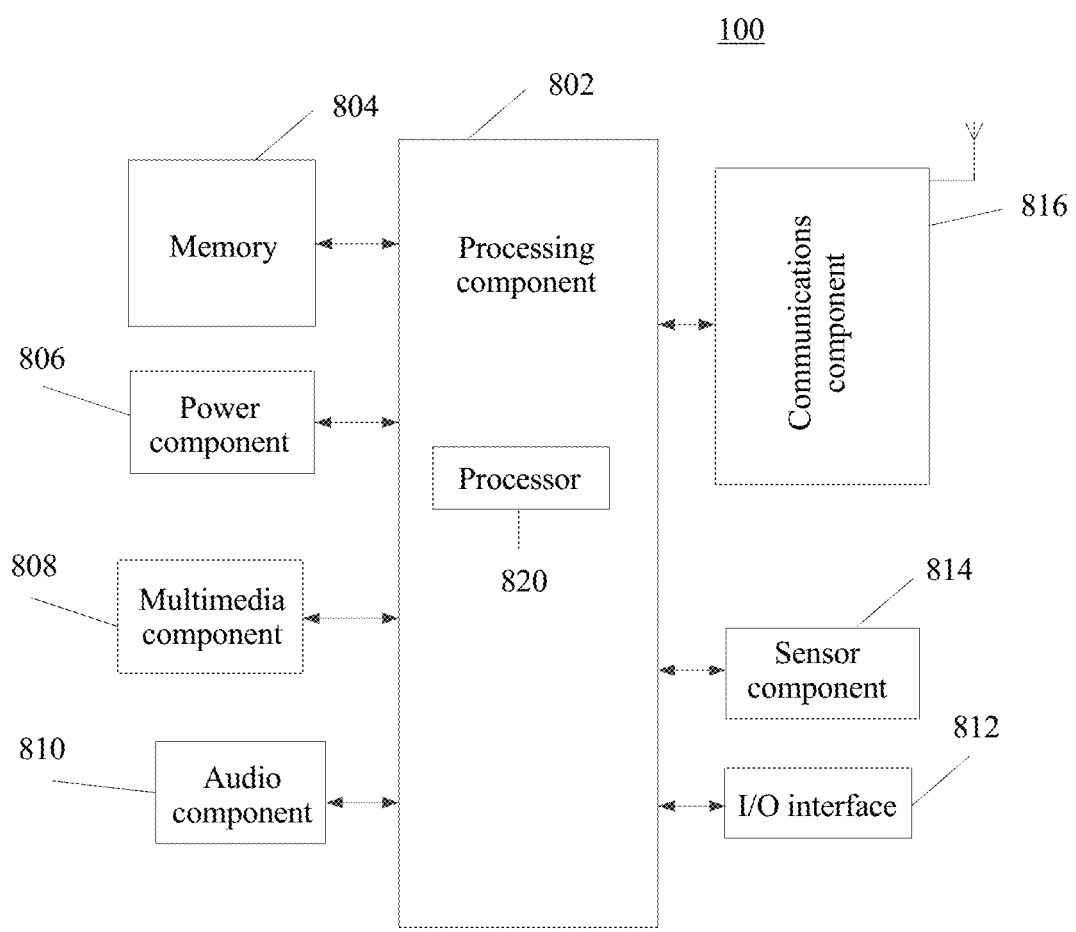
FIG. 10 is a schematic structural diagram of Embodiment 1 of a terminal according to the present invention.

FIG. 10 is a schematic structural diagram of Embodiment 1 of a terminal according to the present invention. Referring to FIG. 10, a terminal 100 may include one or more of the following components: a processing component 802, a memory 804, a power component 806, a multimedia component 808, an audio component 810, an input/output (I/O) interface 812, a sensor component 814, or a communications component 816.

The processing component 802 generally controls an overall operation of the terminal 100, such as an operation related to display, a telephone call, data communication, a camera operation, or a recording operation. The processing component 802 may include one or more processors 820 for executing an instruction, so as to complete all or some steps of the foregoing method. In addition, the processing component 802 may include one or more modules, so that the processing component 802 can interact with another component. For example, the processing component 802 may include a multimedia module, so that the multimedia component 808 can interact with the processing component 802.

The memory 804 is configured to store data of various types to support an operation on the terminal 100. For example, the data includes an instruction, contact data, phone book data, a message, a picture, a video, or the like of any application program or method that is used to be operated on the terminal 100. The memory 804 may be implemented by any type of volatile or non-volatile storage device or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc.

The power component 806 supplies power to various components of the terminal 100. The power component 806 may include a power management system, one or more power supplies, and another component associated with generating and managing power for the terminal 100 and allocating power to the terminal 100.

The multimedia component 808 includes a screen that provides an output interface and that is between the terminal 100 and a user. In some embodiments, the screen may include a liquid crystal display (LCD) and a touch panel (TP). If the screen includes the touch panel, the screen may be implemented as a touchscreen, so as to receive an input signal from the user. The touch panel includes one or more touch sensors, so as to sense touching, sliding, and a gesture on the touch panel. The touch sensor can not only sense an edge of a touching or sliding operation, but also detect duration and pressure related to the touching or sliding operation. In some embodiments, the multimedia component 808 includes a front-facing camera and/or a rear-facing camera. When the terminal 100 is in an operation mode, for example, a shooting mode or a video mode, the front-facing camera and/or the rear-facing camera may receive external multimedia data. Each front-facing camera and each rear-facing camera may be a fixed optical lens system or have a focal length and optical zoom capability.

The audio component 810 is configured to output and/or input an audio signal. For example, the audio component 810 includes a microphone (MIC). When the terminal 100 is in an operation mode, for example, a call mode, a recording mode, or a voice recognition mode, the microphone is configured to receive an external audio signal. The received audio signal may be further stored in the memory 804 or sent by using the communications component 816. In some embodiments, the audio component 810 further includes a speaker that is configured to output an audio signal.

The I/O interface 812 provides an interface between the processing component 802 and a peripheral interface module. The peripheral interface module may be a keyboard, a click wheel, a button, or the like. The button may include but be not limited to a home button, a volume button, a start button, or a lock button.

The sensor component 814 includes one or more sensors, and is configured to provide status evaluation in various aspects to the terminal 100. For example, the sensor component 814 can detect an on/off state of the terminal 100 and relative positioning of components, and the components are, for example, a display and a keypad of the terminal 100. The sensor component 814 can also detect a location change of the terminal 100 or a component of the terminal 100, existence or nonexistence of contact between the user and the terminal 100, an orientation or acceleration/deceleration of the terminal 100, and a temperature change of the terminal 100. The sensor component 814 may include a proximity sensor that is configured to detect existence of a nearby object when there is no physical contact. The sensor component 814 may further include an optical sensor, such as a complementary metal-oxide-semiconductor (CMOS) image sensor or a charge coupled device (CCD) image sensor, that is used in an imaging application. In some embodiments, the sensor component 814 may further include an acceleration sensor, a gyro sensor, a magnetic sensor, a pressure sensor, or a temperature sensor.

The communications component 816 is configured for wired or wireless communication between the terminal 100 and another device. The terminal 100 may access a communications standard-based wireless network, such as Wireless Fidelity (WiFi), 2G or 3G, or a combination thereof. In an example embodiment, the communications component 816 receives a broadcast signal or broadcast related information from an external broadcast management system by using a broadcast channel. In an example embodiment, the communications component 816 further includes a near field communication (NFC) module, so as to facilitate short-range communication. For example, the NFC module may be implemented based on a radio frequency identification (RFID) technology, an Infrared Data Association (IrDA) technology, an ultra-wideband (UWB) technology, a Bluetooth (BT) technology, or another technology.

In an example embodiment, the terminal 100 may be implemented by using one or more of an application-specific integrated circuit (ASIC), a digital signal processor (DSP), a digital signal processing device (DSPD), a programmable logic device (PLD), a field programmable gate array (FPGA), a controller, a microcontroller, a microprocessor, or another electronic component, so as to execute the foregoing method.

In an example embodiment, a non-transitory computer readable storage medium that includes an instruction, for example, the memory 804 that includes an instruction is further provided. The instruction may be executed by the processor 820 in the terminal 100 to complete the foregoing method. For example, the non-transitory computer readable storage medium may be a ROM, a random access memory (RAM), a compact disc read-only memory (CD-ROM), a magnetic tape, a floppy disk, an optical data storage device, or the like.

When the instruction in the non-transitory computer readable storage medium is executed by the processor 820 in 100, the storage medium enables the terminal 100 to execute a switching threshold setting method. The method includes: obtaining a switching threshold of a wireless access device and a transmit power of the wireless access device; and determining and setting a switching threshold of the terminal according to the switching threshold of the wireless access device, the transmit power of the wireless access device, and a transmit power of the terminal, where when detecting that signal strength of the wireless access device is less than the switching threshold of the terminal 100, the processor 820 is to release a wireless communication connection to the wireless access device.

In an embodiment of the present invention, the determining and setting a switching threshold of the terminal according to the switching threshold of the wireless access device, the transmit power of the wireless access device, and a transmit power of the terminal includes: obtaining a first sum value by calculating a sum of a difference between the transmit power of the wireless access device and the transmit power of the terminal 100 and the switching threshold of the wireless access device; and determining and setting the switching threshold of the terminal 100 according to the first sum value.

The determining and setting the switching threshold of the terminal 100 according to the first sum value may include:

determining and setting the switching threshold of the terminal 100 to be greater than the first sum value.

Optionally, the obtaining a switching threshold of a wireless access device and a transmit power of the wireless access device may include: reading the pre-stored switching threshold of the wireless access device and the pre-stored transmit power of the wireless access device; or receiving the switching threshold of the wireless access device and the transmit power of the wireless access device that are sent by the wireless access device.

Further, before the obtaining a switching threshold of a wireless access device and a transmit power of the wireless access device, the processor 820 may be further configured to send a first message to a second device, where the first message is used to request the wireless access device to send the switching threshold of the wireless access device and the transmit power of the wireless access device to the terminal 100.

Figure 11:
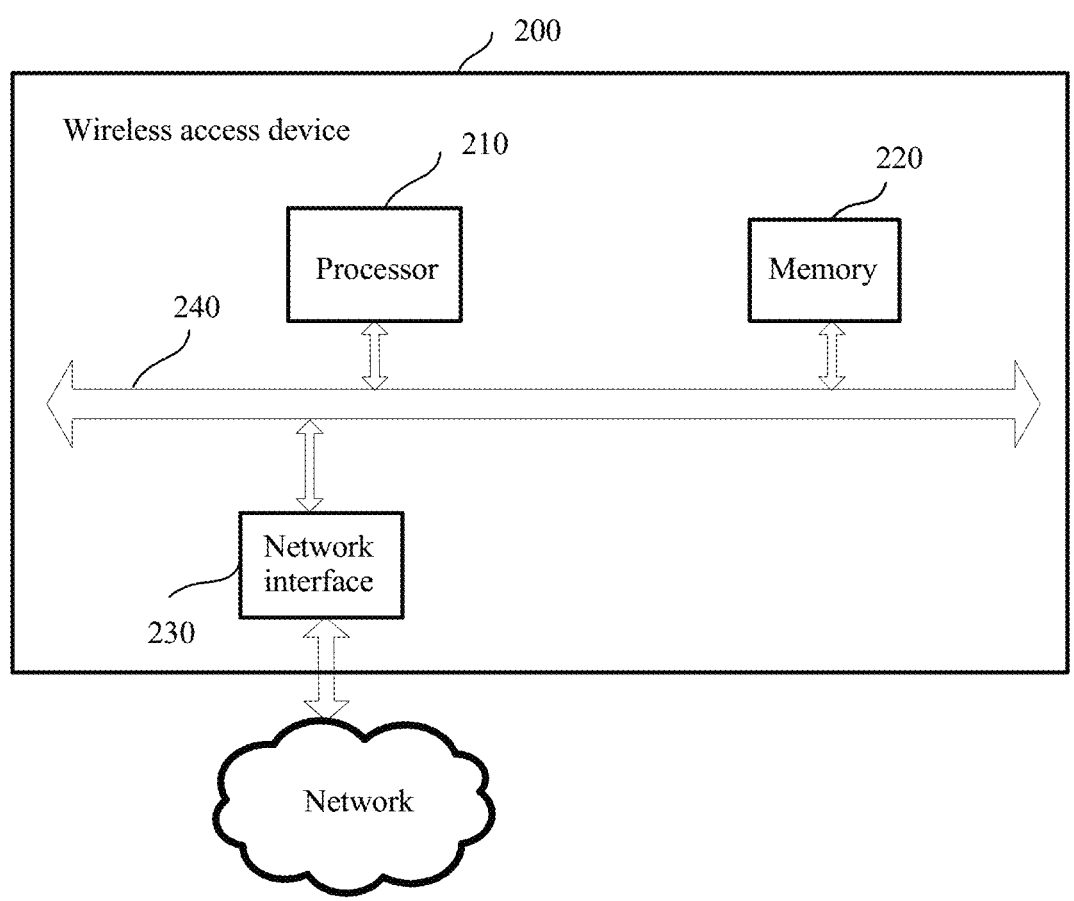
FIG. 11 is a schematic structural diagram of Embodiment 1 of a wireless access device according to the present invention.

FIG. 11 is a schematic structural diagram of Embodiment 1 of a wireless access device according to the present invention. Referring to FIG. 11, a wireless access device 200 in this embodiment includes a processor 210, a memory 220, a network interface 230, and a communications bus 240. The communications bus 240 is configured to implement connection and communication between these components. The memory 220 may include a read-only memory and a random access memory, and provide an instruction and data to the processor 210. The network interface 230 is an interface used by the wireless access device 200 for network communication.

Specifically, the memory 220 stores an executable instruction of the processor 210. When the wireless access device 200 runs, the processor 210 communicates with the memory 220, and the processor 210 invokes the executable instruction in the memory 220 to perform the following operations: obtaining a transmit power of a terminal; determining a switching threshold of the terminal according to the transmit power of the terminal, a switching threshold of the wireless access device 200, and a transmit power of the wireless access device 200; and sending the switching threshold of a second device to the terminal, so that the terminal sets the switching threshold of the terminal, and when the terminal detects that signal strength of the wireless access device 200 is less than the switching threshold of the terminal, the terminal is to release a wireless communication connection to the wireless access device 200.

In a specific implementation of the present invention, the determining a switching threshold of the terminal according to the transmit power of the terminal, a switching threshold of the wireless access device 200, and a transmit power of the wireless access device 200 may include: obtaining a second sum value by calculating a sum of a difference between the transmit power of the wireless access device 200 and the transmit power of the terminal and the switching threshold of the wireless access device 200; and determining the switching threshold of the terminal according to the second sum value.

Optionally, the obtaining a transmit power of a terminal may be specifically: reading the pre-stored transmit power of the terminal; or receiving the transmit power of the terminal that is sent by the terminal.

Further, before the obtaining a transmit power of a terminal, the processor 210 may be configured to receive a second message sent by the terminal, where the second message is used to request the wireless access device 200 to determine the switching threshold of the terminal for the terminal.

Still further, before the obtaining a transmit power of a terminal, the processor 210 may be configured to send a third message by means of broadcasting, where the third message is used to indicate that the wireless access device 200 has a capability to determine the switching threshold of the terminal for the terminal.

In the several embodiments provided in this application, it should be understood that the disclosed device and method may be implemented in other manners. For example, the described device embodiment is merely an example. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A switching threshold setting method, comprising:
 obtaining, by a first device, a switching threshold of a second device and a transmit power of the second device, wherein the switching threshold of the second device and the transmit power of the second device are received from the second device; and
 determining and setting, by the first device, a switching threshold of the first device according to the switching threshold of the second device, the transmit power of the second device, and a transmit power of the first device, wherein determining and setting the switching threshold of the first device comprises:
  obtaining, by the first device, a first sum value by calculating a sum of a first difference and the switching threshold of the second device, wherein the first difference is between the transmit power of the second device and the transmit power of the first device; and determining and setting, by the first device, the switching threshold of the first device according to the first sum value;
wherein when the first device detects that a signal strength of the second device is less than the switching threshold of the first device, the first device releases a wireless communication connection to the second device.

2. The method according to claim 1, wherein when the first device is a terminal and the second device is a wireless access device, the determining and setting, by the first device, the switching threshold of the first device according to the first sum value comprises:
determining and setting, by the first device, the switching threshold of the first device to be greater than the first sum value.

3. The method according to claim 1, wherein obtaining, by the first device, the switching threshold of the second device and the transmit power of the second device comprises:
reading, by the first device, the switching threshold of the second device and the transmit power of the second device which are each pre-stored in the first device.

4. The method according to claim 1, wherein before obtaining, by the first device, the switching threshold of the second device and the transmit power of the second device, the method further comprises:
sending, by the first device, a first message to the second device, wherein the first message is used to request the second device to send the switching threshold of the second device and the transmit power of the second device to the first device.

5. A first device, comprising:
a processor; and
a non-transitory computer-readable storage medium storing a program to be executed by the processor, the program including instructions for:
obtaining a switching threshold of a second device and a transmit power of the second device;
determining and setting a switching threshold of the first device, wherein the switching threshold of the first device is determined according to the switching threshold of the second device and a difference between the transmit power of the second device and a transmit power of the first device, wherein determining and setting the switching threshold of the first device comprises:
obtaining a first sum value by calculating a sum of the switching threshold of the second device and the difference is between the transmit power of the second device and the transmit power of the first device; and
determining and setting the switching threshold of the first device according to the first sum value; and
when the first device detects that signal strength of the second device is less than the switching threshold of the first device, releasing a wireless communication connection to the second device.

6. The first device according to claim 5, wherein the first device is a terminal and the second device is a wireless access device, and the program including instructions for determining and setting the switching threshold of the first device according to the first sum value comprises the program including instructions for:
determining and setting the switching threshold of the first device to be greater than the first sum value.

7. The first device according to claim 5, wherein the program including instructions for obtaining the switching threshold of the second device and the transmit power of the second device comprises the program including instructions for:
reading the switching threshold of the second device and the transmit power of the second device which are each pre-stored in the non-transitory computer-readable storage medium.

8. The first device according to claim 5, wherein the program further includes instructions for:
sending a first message to the second device, wherein the first message requests the second device to send the switching threshold of the second device and the transmit power of the second device to the first device.

9. The first device according to claim 5, wherein the program including instructions for obtaining the switching threshold of the second device and the transmit power of the second device comprises the program including instructions for:
receiving the switching threshold of the second device and the transmit power of the second device that are each sent by the second device.

10. A non-transitory computer-readable storage medium storing a program for execution by a processor, the program including instructions for:
obtaining a switching threshold of a second device and a transmit power of the second device;
determining and setting a switching threshold of a first device, wherein the switching threshold of the first device is determined according to the switching threshold of the second device and a difference between the transmit power of the second device and a transmit power of the first device, wherein determining and setting the switching threshold of the first device comprises:
obtaining a first sum value by calculating a sum of the switching threshold of the second device and the difference between the transmit power of the second device and the transmit power of the first device; and
determining and setting the switching threshold of the first device according to the first sum value; and
when it is detected that signal strength of the second device is less than the switching threshold of the first device, releasing a wireless communication connection to the second device.

11. The non-transitory computer-readable storage medium according to claim 10, wherein the first device is a terminal and the second device is a wireless access device, and the program including instructions for determining and setting the switching threshold of the first device according to the first sum value comprises the program including instructions for:
determining and setting the switching threshold of the first device to be greater than the first sum value.

12. The non-transitory computer-readable storage medium according to claim 10, wherein the program including instructions for obtaining the switching threshold of the second device and the transmit power of the second device comprises the program including instructions for:
reading the switching threshold of the second device and the transmit power of the second device which are each pre-stored in the non-transitory computer-readable storage medium.

13. The non-transitory computer-readable storage medium according to claim 10, wherein the program further includes instructions for:
sending a first message to the second device, wherein the first message requests the second device to send the switching threshold of the second device and the transmit power of the second device to the first device.

14. The non-transitory computer-readable storage medium according to claim 10, wherein the program including instructions for obtaining the switching threshold of the second device and the transmit power of the second device comprises the program including instructions for:

receiving the switching threshold of the second device and the transmit power of the second device that are each sent by the second device.

* * * * *